United States Patent [19]

Kupcikevicius

[11] Patent Number: 4,466,984

[45] Date of Patent: Aug. 21, 1984

[54] ARTICLE FOR USE IN AUTOMATICALLY AND CONTINUOUSLY MAKING STUFFED CASING PRODUCTS WITH FLAT ENDS

[75] Inventor: Vytautas Kupcikevicius, Chicago, Ill.

[73] Assignee: Union Carbide Corporation, Danbury, Conn.

[21] Appl. No.: 430,442

[22] Filed: Sep. 30, 1982

[51] Int. Cl.³ ................... A22C 11/02; F16L 11/00
[52] U.S. Cl. ......................... 426/105; 138/118.1; 426/124; 426/129; 428/36
[58] Field of Search ............... 138/118.1; 17/1, 41, 17/42; 428/36; 426/105, 124, 129

[56] References Cited

U.S. PATENT DOCUMENTS

| | | | |
|---|---|---|---|
| 2,654,121 | 10/1953 | Nelson | 17/32 |
| 2,669,749 | 2/1954 | Hovland | 17/35 |
| 2,886,073 | 5/1959 | Beck | 141/313 |
| 3,233,281 | 2/1966 | Swift | 17/44.2 |
| 3,777,331 | 12/1973 | Falborg | 17/32 |
| 3,808,638 | 5/1974 | Kupcikevicius | 17/35 |

FOREIGN PATENT DOCUMENTS 50-45379 5/1975 Japan.

Primary Examiner—William R. Dixon, Jr.
Attorney, Agent, or Firm—Roger Aceto

[57] ABSTRACT

Disclosed is an article including two or more flat discs arranged in associated pairs, the paired discs being introduced over a stuffing horn and into a casing during the stuffing operation to produce a stuffed casing product having two substantially flat ends. The discs of each pair are separable responsive to the introduction of a food product between the discs wherein one of the separated discs forms the flat leading end of the product and the other discs forms the flat trailing end of the product. In addition the pairs of discs can be joined together to form a chain of paired discs which can be sequentially introduced over a stuffing horn and into a casing during the stuffing thereof to permit the continuous and automatic production of a plurality of flat ended stuffed casing products from a single, continuous length of casing.

37 Claims, 18 Drawing Figures

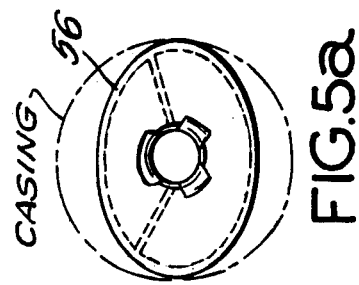
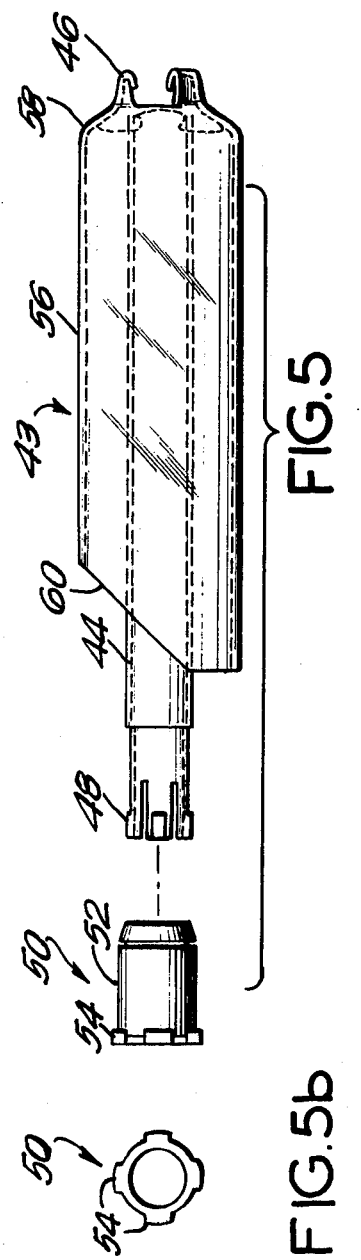
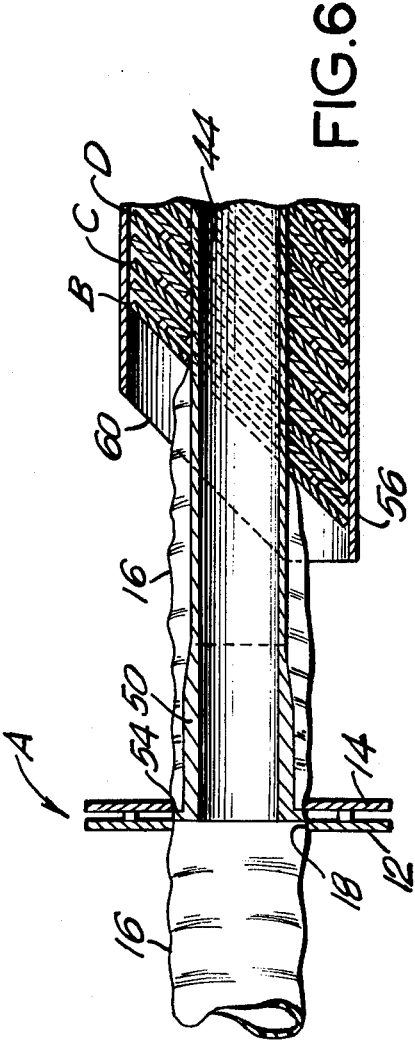

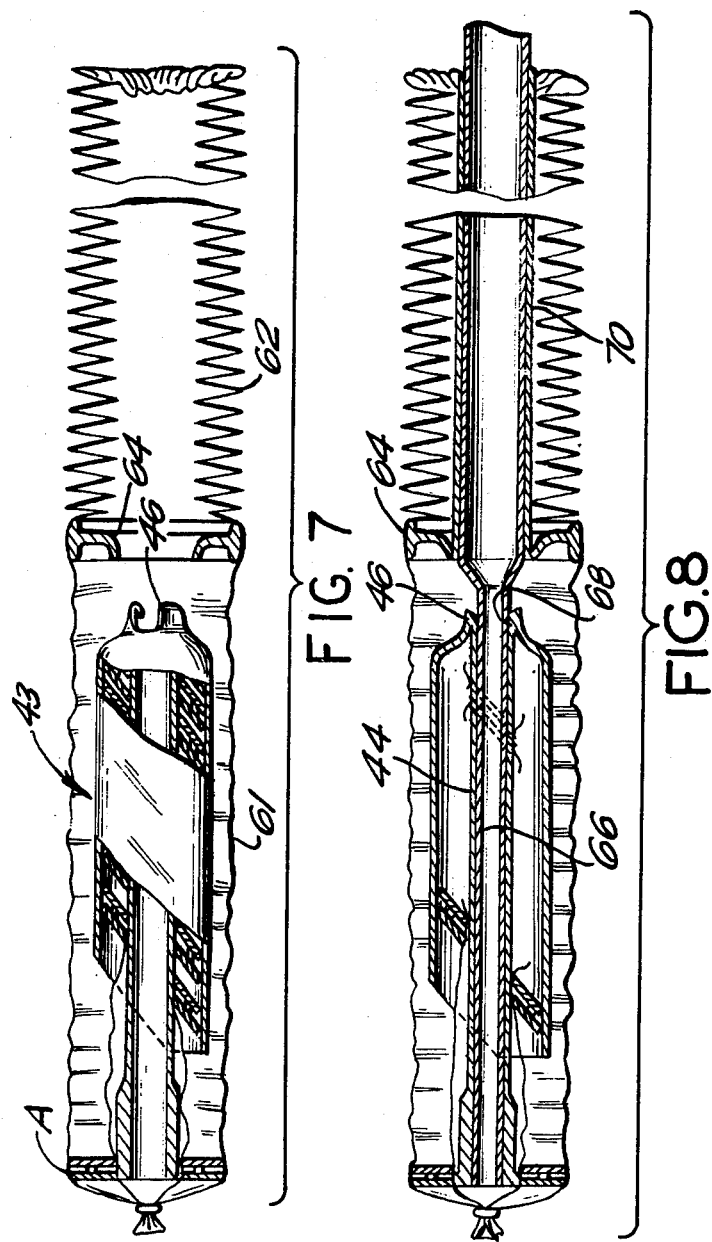

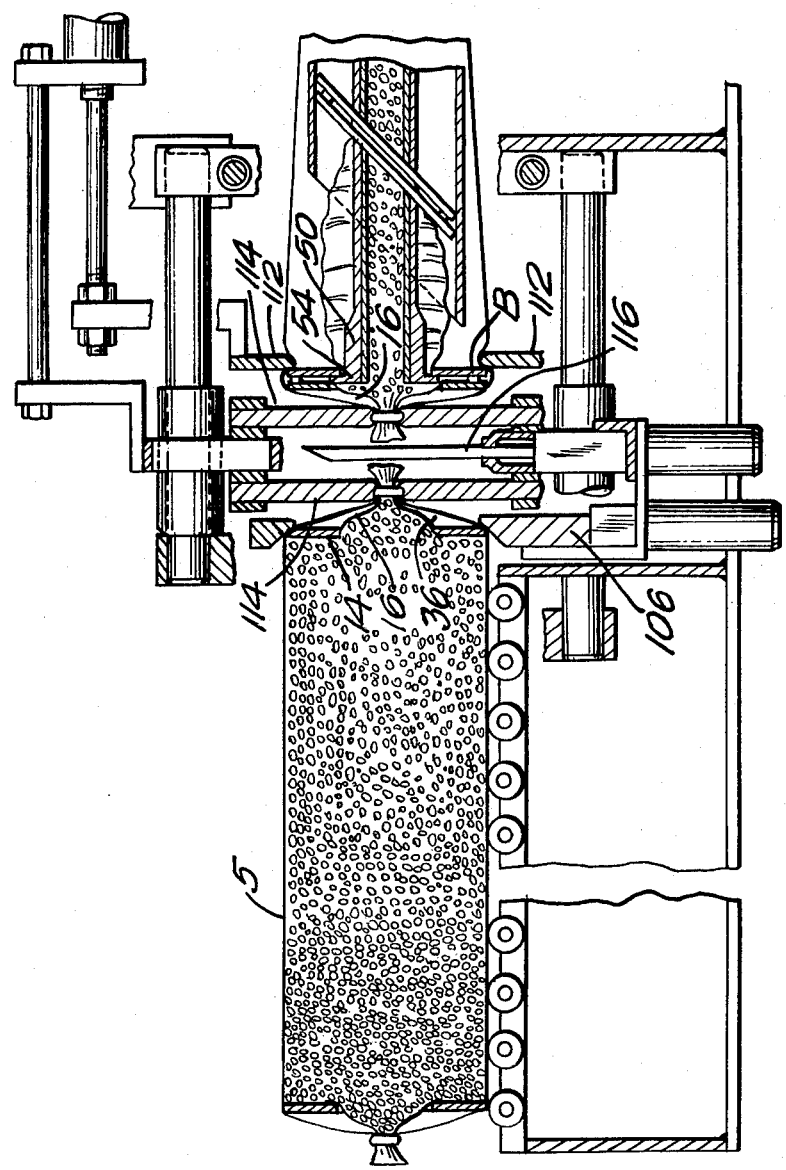

ARTICLE FOR USE IN AUTOMATICALLY AND CONTINUOUSLY MAKING STUFFED CASING PRODUCTS WITH FLAT ENDS

RELATED APPLICATIONS

U.S. patent application Ser. No. 431,353 (Frey), Ser. No. 430,230 (Kupcikevicus, et al), Ser. No. 429,395 (Kupcikevicus), Ser. No. 432,053 (Raudys) and Ser. No. 430,897 (Kupcikevicus, et al) all filed on even date with this application and Ser. No. 448,349 (Raudys) filed on Dec. 9, 1982 are all related to this application.

FIELD OF THE INVENTION

This invention relates generally to the production of large, stuffed casing, sausage type products made of meat emulsion or meat chunks, such as bologna sausage, ham or turkey loaf and the like. More specifically the invention relates to an article useful in automatically and continuously producing such stuffed casing products having flat ends.

BACKGROUND OF THE INVENTION

Large sausage casings are generally manufactured from materials such as regenerated cellulose, or regenerated cellulose having fibrous webs embedded therein, and are employed in the manufacture of large sausage products such as salami and bologna sausages, spiced meat loafs, cooked and smoked ham butts, and the like. Such products may range up to 6½ inches in diameter and lengths may vary from 14 to 72 inches and longer. One way to make such products is to utilize cut lengths of casing having flat widths ranging in size from about 2 to about 15 inches. Some stuffing systems still utilize cut lengths of casing, but such systems do not lend themselves to continuous operation due to the relatively short length of the cut casing.

In recent years, systems for automatically stuffing meats and food emulsions into casings in a continuous fashion have been widely used in the art. Such systems are disclosed, for example, in U.S. Pat. No. 4,007,761 and in U.S. Pat. Nos. Re. 30,265 and Re. 30,390. These systems commonly employ shirred tubular cellulosic food casings as disclosed, for example, in U.S. Pat. Nos. 2,983,949 and 2,984,574 to Matecki.

The systems as disclosed in the above mentioned Reissue Patents have advanced considerably the art of preparing, on an automatic and continuous production basis, stuffed casing products which are substantially uniform in size, shape and quality. These systems use casing lengths of up to 250 feet to manufacture, in a continuous operation, stuffed products of a desired, predetermined length ranging from 14 to 72 inches each or longer. Specifically, these systems utilize shirred casing lengths, and include means to regulate the shape and conformation of the leading and trailing closed ends of the product, in relation to the predetermined recommended stuffed diameter for a given size of casing.

After stuffing, the product is cooked or cured according to conventional processes. Many of the large sausage-type products are thereafter sliced and packaged into units of predetermined weight and slice count for retail sale. The slicing devices employed in such packaging operations are pre-set to yield a specific weight-by-slice count for use in obtaining unit packages of equal weight.

In order to produce uniform slices for as much of the full length of the product as possible, it is desirable that the closed leading and trailing ends of the product be substantially flat. Several attempts have been made to provide stuffed casing products with flat ends. However, prior to the present invention, stuffed casing products as made from a continuous length of casing all had at least one, and usually two generally hemispherical or rounded ends. These rounded ends of the product are generally not suited to be used in producing uniform slices for the equal weight packages as sold in the retail trade. Consequently, the rounded ends are sliced off and product contained in these rounded ends is reworked. The term "rework" refers to product which is reprocessed for use in a subsequent batch of food emulsion.

In order to minimize the rework resulting from these rounded ends, many prior attempts have been made to flatten them by utilizing a variety of methods and apparatus. While such attempts have attained some degree of success, none has proved to be entirely satisfactory. For example, U.S. Pat. No. 3,803,638 discloses a method for producing large sausage products having one pre-flattened end. This method does reduce the sausage end rework by one-half, but substantial rework is still present in the non-flattened end. As a further example, U.S. Pat. No. 3,777,331 discloses a method and apparatus for producing encased sausage with two flat ends whereby the end pieces are inserted in a non-fully automatic fashion. The particular method and apparatus as disclosed in the '331 Patent is limited to the use of continuous lengths of non-shirred casing, and does not lend itself to efficient commercial operation.

Reducing the incidence of rounded ends and consequently reducing the amount of rework can be accomplished by increasing the length of the stuffed product. However, exceedingly long lengths of stuffed product are not practical for various reasons, including, for example, the limitations of the stuffing apparatus, the apparatus for handling and transporting the stuffed product, the cookers, and the slicing apparatus. Thus, there are upper limits to lengths of stuffed product which can be reasonably and economically processed so that the most practical way of reducing rework resulting from rounded ends, is to provide as flat an end as possible.

According to the present invention, it is now possible to produce stuffed casing products continuously and automatically, having the shape of a right circular cylinder, that is, a stuffed casing product having substantially flat leading and trailing closed ends.

In the present invention, there is provided an extender article in the form of connected annular flattening discs. The article is designed so that the discs can be introduced over the stuffing horn and into a casing during the stuffing operation to substantially flatten both ends of the stuffed casing product. Moreover, a plurality of the extender articles of the present invention can be incorporated into a package article and mounted to a stuffing horn of an automatic stuffing machine so that flat ended stuffed casing products can be produced from lengths of shirred casing continuously and automatically, without interruption, until the length of shirred casing is spent.

Accordingly, it is a primary object of the present invention to provide an extender module that is useful in producing stuffed casing products, and particularly large sausage products, with flat ends from shirred casings.

Another object of the present invention is to provide an extender module for use in the continuous and automatic production of flat ended sausage type products, which considerably reduces the need to rework or reprocess that portion of the sausage material contained in the rounded ends of similar size sausage type products made without the extender article.

Still another object of the present invention is to provide an extender module that can be incorporated into a package article containing a plurality of extender modules, the package article in turn being mountable on the stuffing horn of a stuffing machine, for the continuous and automatic production of stuffed casing products having two substantially flat terminal ends.

A further object of the present invention is to provide an extender module which can be adapted for use in conjunction with either a shirred casing for a fully automatic, continuous stuffing operation, or with cut lengths of unshirred casing for a less than fully automatic stuffing operation, to produce stuffed product having substantially flat ends.

These, and other objects of the present invention will become apparent from a reading of the specification.

SUMMARY OF THE INVENTION

The present invention may be characterized in one aspect thereof by the provision of an extender module for flattening the ends of a stuffed casing product comprising a pair of substantially rigid discs, at least one of which is annular, and a flexible means extending between and connecting the discs, so that the discs may be collapsed axially one against the other with the flexible means folded between the discs.

In another aspect of the invention, the extender module includes means for detachably connecting a disc of one extender module with a disc of a second similar extender module, so that a plurality of extender modules can be detachably connected one to another in an ordered array of two or more extender modules, by virtue of direct or indirect contact between a disc of one extender module and a disc of the adjoining extender module.

The invention is also characterized by an encased food product having a flat disc implanted in each end of the product with the casing of the product being clip closed over the discs, the disc at the trailing end of the product having an opening therethrough and a flexible tubular membrane having one end connected to the disc at the trailing end about the opening, the other end of the membrane being clip closed together with the casing. The outer periphery of both discs is in contact with the inner periphery of the casing so as to form a stuffed casing product having the shape of a right circular cylinder, the discs being components of a disc pair inserted into the casing prior to the stuffing thereof.

DESCRIPTION OF THE DRAWINGS

FIG. 5, FIG. 5a, and 5b are side elevation and end views, respectively, of a housing and mandrel as may be employed to contain the extender modules of the present invention for use;

FIG. 6 is an elevation view, in section, showing a portion of the FIG. 5 housing as filled with an ordered array of connected modules of the present invention to provide an extender package article;

FIG. 7 shows the extender package article of FIG. 6 and a casing sizing means implanted in the unshirred portion of a shirred casing to form a shirred casing extender package article;

FIG. 8 shows the extender package article of FIG. 7 in place on a stuffing horn assembly;

FIGS. 12–15 show portions of an automatic stuffing apparatus during varous stages of a continuous stuffing cycle, the apparatus being modified to accommodate a shirred casing extender package article utilizing the extender module of the present invention.

DESCRIPTION OF THE PREFERRED EMBODIMENT

Figure 1:
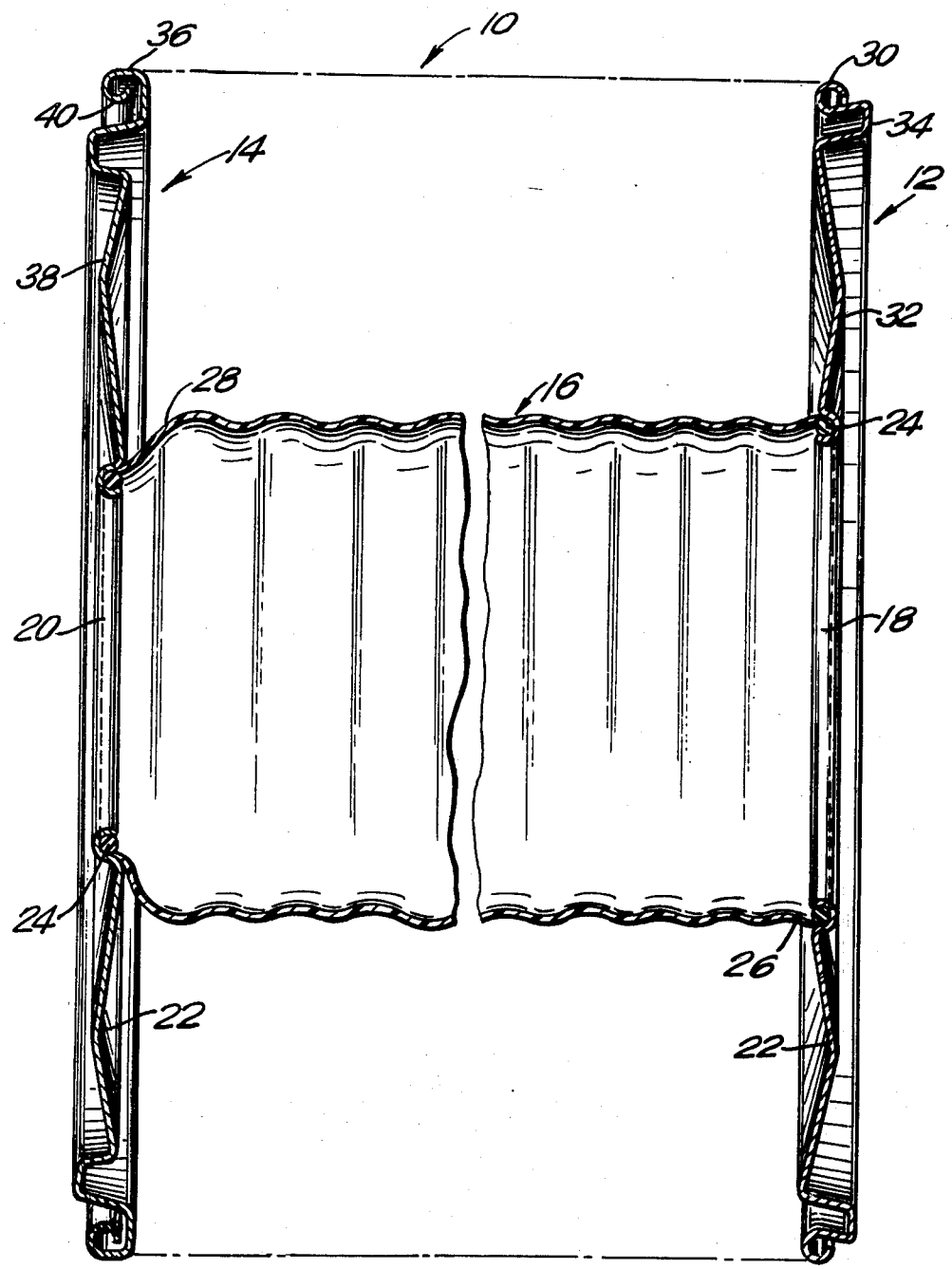
FIG. 1 is a side elevation view, in vertical section, showing an extender module of the present invention.

Referring to the drawings, FIG. 1 shows an extender module of the present invention generally indicated at 10, adapted for use in the automatic production of large sausage products having flat ends. The module 10 includes a leading extender or flattening disc 12 and a trailing extender or flattening disc 14 connected by a flexible tubular membrane 16.

The term "extender" or "flattening disc" as used herein designates a substantially flat disc, which when inserted at either end of a stuffed product will flatten the ends thereof to provide a product that is substantially the shape of a right circular cylinder. When used in the making of a finished food product of relatively large diameter (2 to 7 inches) of the type which, after processing, is sliced and then sold in package form, the extenders will flatten or at least partly flatten the ends of such product from the conventional rounded configuration, thereby reducing the rework needed to reprocess the portion of the food product which would otherwise be contained in rounded ends.

The terms "leading" and "trailing" as applied to the extenders, denotes whether the particular extender or flattening disc forms the leading end or the trailing end, respectively, of a stuffed product. Thus, with reference to the extender module 10 as shown in FIG. 1, leading extender 12 will go to form a flat leading end of a stuffed product during the stuffing operation, while trailing extender 14 will go to form a flat trailing end of a stuffed product.

To facilitate flattening the ends of the stuffed product, each extender 12, 14 should have at least one flat surface. In particular, the rearwardly and outwardly facing surface 32 of leading extender 12 will be in direct contact with the front of the stuffed product, so it will establish the flatness of a product's closed leading end.

The forwardly and outwardly facing surface 38 of the trailing extender 14 will likewise be in direct contact with the rear of the stuffed product, so it will establish the flatness of a product's closed trailing end.

Each extender 12, 14 as shown in FIG. 1 is, generally, the shape of a relatively flat, annular disc so that both the outwardly and inwardly facing surfaces of each disc are flat. Preferably, the central opening 18 in leading extender 12 is larger in diameter than the central opening 20 in trailing extender 14 for purposes set out herein below.

Also, it is preferred that each opening 18, 20 be as small as possible as this will facilitate maximum flattening of the ends of the stuffed product. For example, when the extenders are round, the diameter of each opening should not exceed 90 percent of the overall extender diameter and preferably, should not exceed 50 percent of the extender diameter. Since in a preferred embodiment, both extenders will be located on a stuffing horn assembly, the size of the openings 18, 20 should be sufficient to allow passage of the stuffing horn therethrough.

Each extender 12, 14 is slightly dished about its opening as shown at 22. In part, this strengthens each extender and helps to prevent deformation in use. The portion of each extender about openings 18, 20 is also bent inward and formed about a core 24 of polyethylene or other suitable, relatively resilient material. Captured between each core and the material of the extenders as formed about these cores, are the respective ends 26, 28 of the tubular membrane 16. In this fashion, the tubular membrane defines a tubular passage having one end 26 defined by opening 18 in the leading extender 12 and its second end 28 defined by opening 20 in the trailing extender 14.

Leading extender 12 has a bead or rim 30 formed about the outer periphery to add strength and rigidity to the extender. Since, in use, extender 12 will be disposed within a stuffed casing, the bead also will help to prevent the extender from damaging the casing during the stuffing process as the casing is stretched over the bead to effect a seal betwen the inner perimeter of the casing and the outer perimeter of the leading extender 12.

Formed on the rear, or outwardly facing surface 32 of the leading extender 12, is an annular shoulder 34. This shoulder is disposed about the leading extender adjacent its outer periphery for purposes set out hereinbelow.

As shown in FIG. 1, the trailing extender 14 has its outer periphery formed with a flange 36 that is bent or rounded over its forward, or outwardly facing surface 38. This configuration provides the rim of the trailing extender 14 with a rounded surface so that in use, a casing can be stretched over the trailing extender to effect a seal similar to the seal between the casing and the leading extender. This configuration also provides an annular lip which extends about the periphery of the trailing extender. This lip is not continuous but has pieces removed so as to form a plurality of tabs 40 spaced about the periphery of the trailing extender.

Tabs 40 on the trailing extender 14 and the shoulder 34 on the leading extender are coincident, and the respective sizes of shoulder 34 and tabs 40 are such that the shoulder can snap-fit under the tabs. With this arrangement a leading extender 12 of one extender module 10 can be detachably connected to the trailing extender 14 of a second extender module simply by aligning the respective leading and trailing extenders and then snapping shoulder 34 beneath tabs 40 as shown in FIG. 2.

Figure 2:
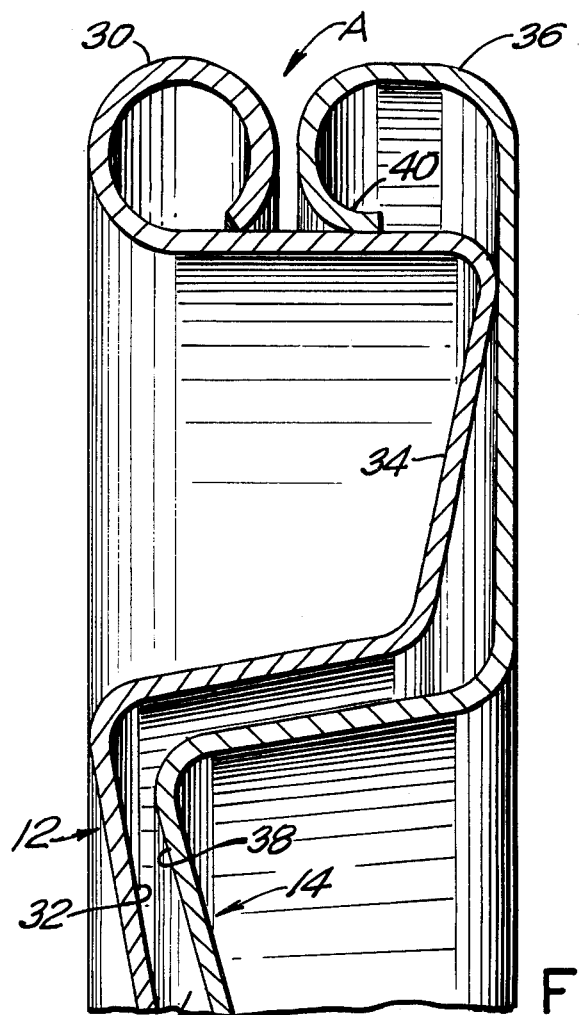
FIG. 2 is a sectional view on an enlarged scale, showing a connection of one extender module to another to form an extender pair.

When a leading extender 12 of one extender module is snapped together with a trailing extender 14 of a second extender module as shown in FIG. 2, a space 15 is defined between the outwardly facing surfaces 32, 38 respectively of the two extenders. As will be described further hereinbelow, the snap fit between the extenders should be designed to permit the extenders to separate responsive to the pressure of the food emulsion being pumped into this space 15.

For purposes of describing the present invention, a leading and a trailing extender which are detachably connected together as shown in FIG. 2, will be referrred to as "an extender pair" and will be identified by letters A, B, C, etc. Thus, FIG. 2 shows an extender pair A formed by detachably connecting a leading extender 12 of one extender module 10 (FIG. 1), to the trailing extender 14 of another, identical extender module. In this fashion, any number of extender modules 10 can be detachably connected to form an ordered array of extender pairs A, B, C, etc., each extender pair being connected to the following extender pair by flexible tubular membrane 16. Such an arrangement is shown in FIG. 3.

Figure 3:
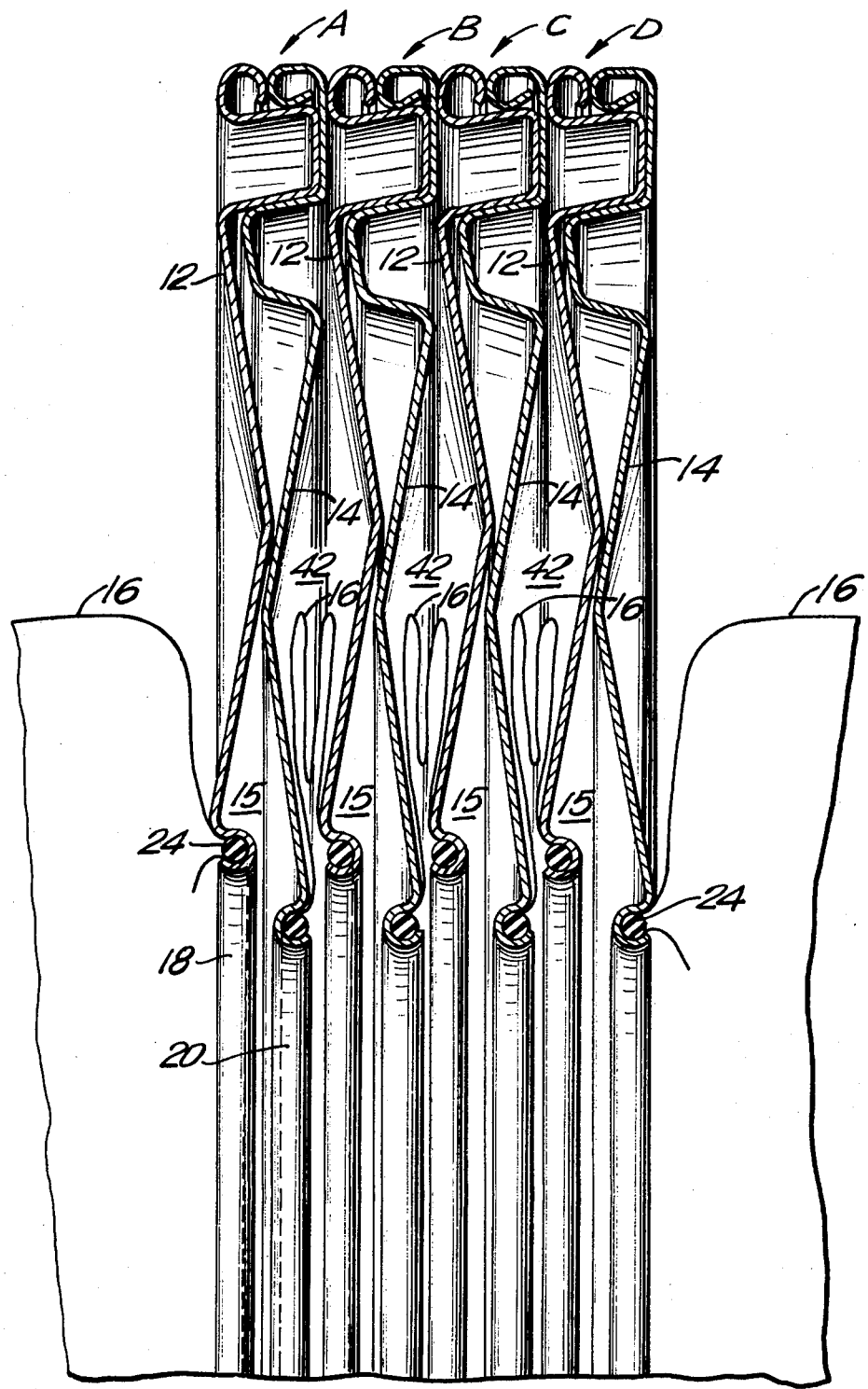
FIG. 3 is a view similar to FIG. 1, only showing a plurality of the extender modules connected together to form an ordered array.

FIG. 3 shows four extender pairs A, B, C and D connected one to another by tubular membranes 16. It should be understood that four extender pairs are shown for purposes of illustration only, and that any number of extender modules 10 can be connected as may be needed. Moreover, since tubular membrane 16 is flexible, the extender pairs A, B, C and D can be collapsed axially one against the other to form a relatively compact, ordered array of extender pairs. When the extender pairs are collapsed together, the dished configuration of the leading and trailing extenders 12, 14 respectively, as described hereinabove, provides a space 42 between each extender pair A, B, C, etc. This space 42 accommodates the tubular membrane 16 which folds into this space as shown in FIG. 3.

While it is preferred that each extender 12, 14 be a relatively flat annular disc, a wide variety of shapes is possible. For example, where the stuffed product is later molded or otherwise formed to some shape other than round in cross-section, the extenders should be of a shape conforming to the finished cross section of the stuffed product. However, it is presently believed that the extenders will be used primarily in the production of stuffed products which are round in cross-section so the extenders will be described herein as being round.

The limitation as to the shape of the outer periphery of the extender is dictated primarily by the need to conform the extender generally to the inner perimeter of the casing of the stuffed product. In this regard, it is important that a tight seal exist between the inner casing perimeter and the outer annular disk perimeter so that a seal may be maintained during and after the stuffing operation as will be described hereafter.

Figure 4:
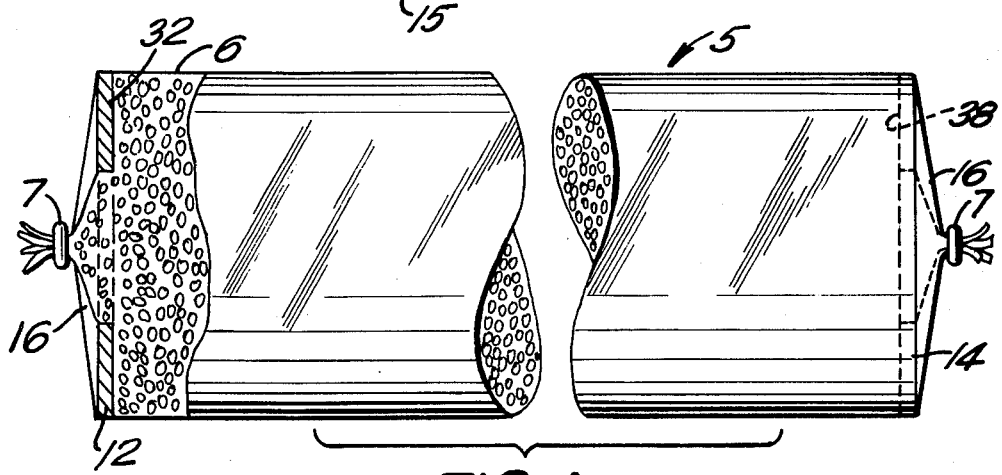
FIG. 4 is a view, partly broken away and in section, showing a stuffed casing product as may be made with the extender module of the present invention.

One function of this seal is illustrated in FIG. 4. FIG. 4 shows the leading and trailing extenders 12, 14 located at the terminal leading and trailing ends respectively of a stuffed casing product 5 such as a bologna or the like. The extenders are disposed within a casing 6 and considerably flatten the ends of the stuffed product in comparison to the generally hemispherical or rounded configuration which is more conventional. The ends of the casing 6 are gathered tightly over the outer perimeter of each extender and closed by metal clips 7 as is conventional in the art.

Portions of tubular membrane 16, still attached to the leading and trailing extenders, are also closed with casing 6 by the same metal clips. It is only that small portion at each end of the stuffed product, which lies within the clipped tubular membrane 16, and outside of the flat ends, which is subject to rework. It should be readily appreciated that this amount of product subject to rework is substantially less than the amount of product contained in a conventional rounded end.

It should be understood that the leading and trailing extenders as shown at the ends of the stuffed product 5, formerly constituted an extender pair such as shown at A, B, C or D in FIG. 2 and FIG. 3. Because the casing is tightly gathered over the extenders, a seal is formed therebetween during the stuffing operation and is maintained throughout the subsequent processing of the stuffed product.

The extenders or flattening discs useful in the present invention can be made of a wide variety of materials, provided that the surface of the material chosen (or a coating on the surface of the material) meets the required government specification for use with food products. Useful materials include metals such as aluminum and steel, and plastics such as polystyrene and polypropylene. It is preferred that the extenders each be of sufficient strength to resist deformation in the stuffed product. The preferred extenders of the present invention are annular discs constructed from 75 lb. tin-plated steel having a thickness of about 0.007 inch with a food approved surface coating, and having stiffening annular ribs and a dish shape as shown (as often found in can lids) for added support. While a substantially flat shape is preferred, due to the intended use of the extenders in making stuffed products which are generally the shape of a right circular cylinder as shown in FIG. 4, the extenders could also be shaped to provide the ends of the stuffed product with some other contour.

The material suitable for use as flexible tubular membrane 16 is preferably a plastic film such as, for example, polyethylene film. It is preferred that the flexible tubular membrane occupy a minimum of space when fully collapsed in order to minimize the overall length of the ordered array of extender pairs. Accordingly, the membrane should be relatively thin (on the order of 1½ to 5 mils), yet strong enough to withstand the stuffing pressures encountered in producing a stuffed casing product such as that shown in FIG. 4. The length of the membrane 16 in each extender module 10 may vary, but preferably is about 5 inches long.

While a means for snap fitting the leading extender 12 of one extender module 10 to the trailing extender 14 of another extender module has been described, it should be appreciated that other means can be employed for making this detachable connection. For example, a suitable adhesive, double sided tape or other appropriate break-away mechanical means can be used. When a break-away connector means is used, such as the snap fit described herein, it is important and preferred that components of the connector not separate from its associated leading or trailing extender. For example, in the snap fit as described in FIG. 2, tab 40 should not separate from trailing extender 14. This is to prevent components of the connector from coming loose and thereafter mixing with the food emulsion being stuffed into the casing.

Figure 11:
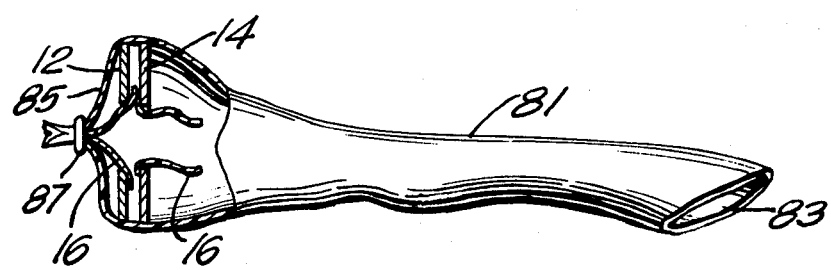
FIG. 11 shows an extender pair of FIG. 2 as may be used in conjunction with a cut length of unshirred casing to form a cut length package article.

The extender module 10 and the connected ordered array of extender pairs A, B, C, etc., as described herein, can be utilized in a variety of ways to provide a stuffed casing product as shown in FIG. 4. For example, several package configurations, a suitable stuffing apparatus, and a method employing the extender module and extender pairs, are described hereinbelow. Except for the package article as shown in FIG. 11, such package configurations, stuffing apparatus and methods, form no part of the present invention and are described in this application only for illustrative purposes, as these are more fully described and claimed in co-pending patent applications Ser. Nos. 431,535 and 430,230, the disclosures of which are incorporated herein by reference.

FIGS. 5 and 6 show one package arrangement which facilitates the use of the present invention for continuous production of large sausage products having flat ends. In FIG. 5 a support frame or magazine for holding a compact, ordered array of extender pairs is shown at 43. This support frame or magazine includes a mandrel or support tube 44, the aft end of which is provided with a suitable quick-connect means 46 for attaching the support frame to a stuffing horn assembly of a stuffing machine. A conventional stuffing machine which may be modified to accept the support frame as described herein is shown in U.S. Pat. No. Re. 30,390. As the stuffing machine per se forms no part of the present invention, only parts of such an apparatus and its method of operation will be shown and described hereafter, as may be necessary to a complete understanding of the present invention.

The forward end of mandrel 44 is also provided with a quick-connect means 48 which can be snap connected to a nose piece shown at 50. The separate nose piece is required to facilitate the loading of an array of the extender pairs onto the mandrel 44. In this respect, the array is loaded first and then the nose piece is snapped onto the forward connector means 48 to capture the array on the mandrel.

The nose piece has a body portion 52 which is small enough in diameter to pass both the leading and trailing extenders 12, 14 of each extender pair. On the forward end of the nose piece is an interrupted flange 54 (FIG. 5b). The outside diameter of the flange is small enough to pass the leading extender 12 of each extender pair, yet large enough to catch the trailing extender 14 of each extender pair. In this regard, it should be recalled that the opening 18 in the leading extender 12 preferably is larger in diameter than opening 20 in the trailing extender 14 (FIG. 1). While the trailing extender will not readily pass over the interrupted flange 54, the inner periphery of the trailing extender 14 can be designed to flex to enlarge opening 20 so that when trailing extender 14 is subjected to a sufficiently large axial force, it can be forced over the flange and off of the nose piece. Conversely, the interrupted flange can be designed so that it will flex and permit passage of the trailing extender.

The support frame or magazine 43 also includes a sleeve 56 disposed about a portion of the mandrel 44. Sleeve 56 is closed at its rear 58, which is either attached to, or formed integral with, the aft end of the mandrel. The front of the sleeve is open at 60 to permit the loading of the array of extender pairs A, B, C, etc., onto the mandrel and into the sleeve as shown in FIG. 6. The sleeve thus forms a protective overwrap or housing for the array of extender pairs.

Figure 9:
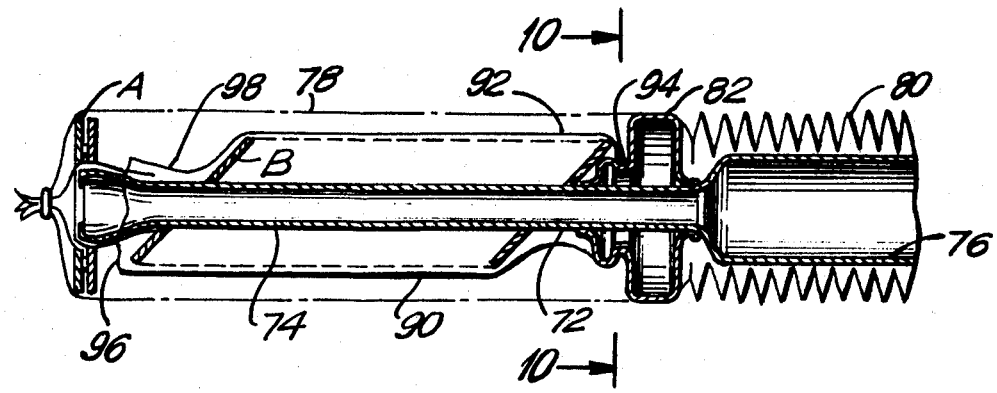
FIG. 9 is a view similar to FIG. 7, showing still another form of a shirred casing extender package article as may employ the extender article of the present invention.
Figure 9A:
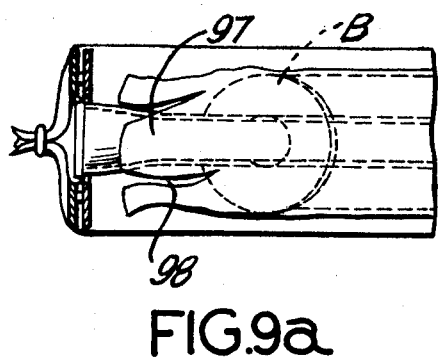
FIG. 9a is a top view of a portion of the embodiment shown in FIG. 9.

In construction, the sleeve can either be a rigid member as shown or a semi-rigid or flexible overwrap. If rigid, the open end 60 of the sleeve should have its upper end cut away to form the angled exit as shown. If semi-rigid or flexible overwrap is used, the open end of the sleeve preferably is split as shown in FIG. 9 and 9a. The purpose of both constructions will be discussed further hereinbelow.

To load the support frame 43 to provide the extender package article shown in FIG. 6, the array of extender pairs A, B, C, etc., is stacked on mandrel 44 and nested into the housing formed by sleeve portion 56. Preferably the array is canted on the mandrel as shown in FIG. 6. This allows the sleeve to be generally elliptical in vertical cross section (see FIG. 5a) because the projection of the round, but canted, array of extender pairs onto a plane normal to the mandrel axis, will be an ellipse.

The casing to be stuffed, as is shown in dotted line in FIG. 5a, will have a diameter generally equivalent to or slightly less than the diameter of an extender pair. Thus, the canting of the array of extender pairs as described will allow a casing to be stuffed to be drawn over the sleeve during the stuffing operation with minimal drag or retardation of movement. This retardation of movement is more commonly referred to as "holdback".

After the array of extender pairs is loaded onto the support tube or mandrel 44, the nose piece 50 is snapped onto the mandrel via quick connect means 48 to capture the extender pairs on the mandrel. The first extender pair A, is then moved onto the nose piece and oriented in an upright position, that is, perpendicular to the axis of the mandrel, in preparation for use.

The portion of tubular membrane 16 located forward of extender pair A can either be left open as shown, or can be gathered and closed by a clip or other suitable closure. If left open, it must be gathered and closed together with the casing prior to initiation of the stuffing cycle.

In use, the extender package article as shown in FIG. 6 can be mounted on the stuffing horn assembly. An unshirred portion of casing from a casing supply is then pulled over the extender package article of FIG. 6. The casing is then clipped closed together with the loose portion of tubular membrane 16 connected to the leading extender 14 of upright extender pair A to start an automatic stuffing operation as will be described further hereinbelow.

If desired, the entire support frame 43 and its stored array of extender pairs can be inserted into an unshirred portion of a shirred casing stick to provide a shirred casing extender package article as shown in FIG. 7. In this respect, FIG. 7 shows the support frame or magazine 43 of FIGS. 5 and 6 disposed inside an unshirred portion 61 of a shirred casing stick 62. Preferably, the casing stick also contains a sizing means 64 implanted in the unshirred portion 61 of the stick intermediate the aft end of support frame 43 and the shirred portion of the shirred casing stick. The sizing means 64 may take the form of a sizing disc as is coventional in the art. Such a sizing disc and its functions are more particularly described, for example, in U.S. Pat. Nos. 4,007,761, 4,077,090 and 4,164,057 and U.S. Pat. Nos. Re. 30,265 and Re. 30,390, all incorporated herein by reference.

If the arrangement as shown in FIG. 7 is used to implement the invention as described herein, the quick connect means 46 would be used to connect the support frame 43 to an appropriately modified stuffing horn assembly. The modification of the stuffing horn assembly as shown in FIG. 8 includes extending the length of the stuffing horn 66 so that it extends through substantially the entire length of the mandrel 44 and providing a connector 68 for quick connection to the connector means 46. Other portions of the stuffing horn assembly, as shown, include a movable support sleeve 70 to which the sizing means 64 connects in a conventional manner.

In still another package arrangement, as shown in FIG. 9, the mandrel is an elongated tubular member 72 having a forward support portion 74 and a rearward support portion 76. Forward support portion 74 carries the ordered array of extender pairs A, B, C, etc., in an unshirred portion 78 of casing while the rearward support portion 76 carries a length of shirred tubular casing 80.

The shirred casing 80 on support portion 76 can be a cored high density shirred casing stick as more particularly described in a co-pending application Ser. No. 261,304. In a cored high density configuration, flexible tubular cellulosic food casing is shirred and compressed onto a rigid hollow tubular core to a high compaction condition to produce a casing stick with enhanced stuffing length capacity, structural stability and strength, and larger stuffing horn adaptability.

Figure 10:
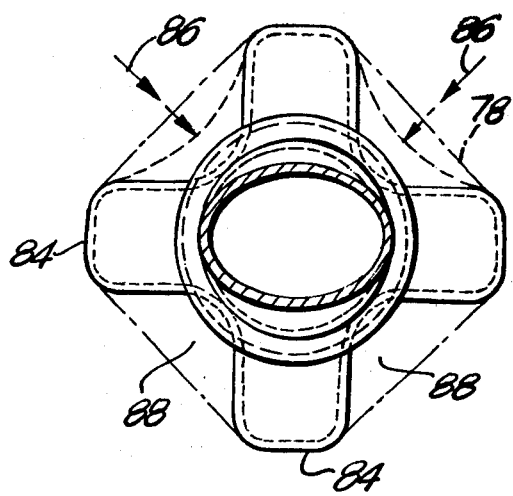
FIG. 10 is a view, on an enlarged scale, taken along lines 10—10 of FIG. 9.

Fixed to the mandrel intermediate the forward and rearward portions 74 and 76, is a sizing means 82. While sizing means 82 can be a conventional sizing disc such as described in U.S. Pat. No. 4,007,761, a preferred sizing means is one having a convoluted outer perimeter as shown in FIG. 10. A detailed description of a sizing means as shown in FIGS. 9 and 10 is contained in a co-pending application Ser. No. 430,582. Briefly, such a sizing means has lands or casing engaging surfaces 84 (FIG. 10) adapted to contact the inner perimeter of unshirred casing 78 at circumferentially spaced positions. This sizing means then cooperates with an external stretching means, schematically indicated at 86, to stretch the casing sufficiently to result in the desired stuffed diameter for the resulting encased stuffed product. In this respect, external stretching means 86, preferably mounted to the stuffing apparatus, is arranged to move radially into one or more of the recesses 88 between the lands 84 in order to contact the outer perimeter of the casing. As the external stretching means continues to move into one or more of the recesses 88, the casing 78 is stretch-deformed, as shown in dotted line, into the recesses and over the lands to provide the desired "sized" casing diameter just prior to stuffing.

The package as shown in FIG. 9 also utilizes a flexible overwrap 90 to insure the ordered integrity of the array of extender pairs A, B, C, etc., instead of a rigid sleeve. A typical overwrap would comprise an elastic film such as a polyvinylchloride or polyethylene film. If a flexible film is used, as opposed to the rigid sleeve 56 of FIG. 5, its rearward end 92 should be tethered by any suitable means such as a clamp 94. Its forward end 96 should have one or more longitudinal slits 98 (as best seen in FIG. 9a) extending inward from the edge of the wrap and along the top of the wrap to a point adjacent the first extender pair B, in the array. These slits will allow extender pair B to pivot to an upright position through the wrap as is further discussed hereinbelow.

In use, the extender modules and extender pairs of the present invention, preferably as incorporated into one or another of the prepackaged arrangements shown in FIGS. 6, 7 or 9, is loaded onto a stuffing apparatus.

The stuffing apparatus which can be employed in conjunction with the invention is preferably a modification of that set forth in U.S. Pat. No. Re. 30,390, the disclosure of which is incorporated herein by reference. A detailed description of an appropriately modified apparatus is contained in copending U.S. application Ser. No. 430,230. Accordingly, only so much of a description of the construction and operation of such an apparatus will be given as is required to permit an understanding as to how the present invention can be used in cooperation with stuffing apparatus to produce flat ended stuffed casing products continuously and automatically. Of course, the article of the present invention is envisioned to work with a wide variety of other apparatus that may be devised by those working in the field.

Figure 12:
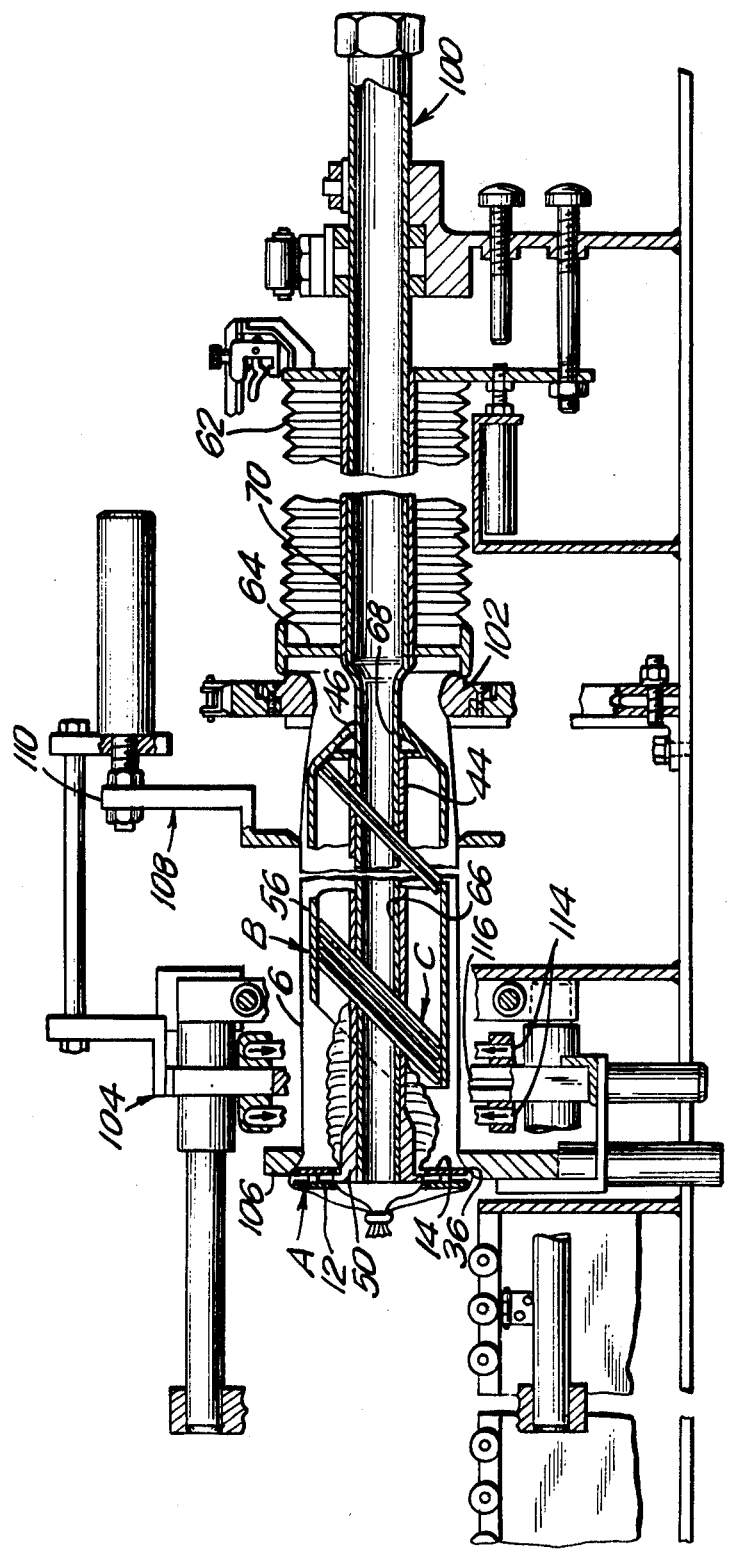

In any event, FIG. 12 shows a stuffing apparatus as may be used in conjunction with the extender package article of FIG. 6 or the package article as shown in FIG. 7. In either case, the stuffing apparatus includes a stuffing horn assembly 100, which is modified to accomodate the extender package article. This modification includes extending the length of the stuffing horn 66 so that it will pass through the mandrel 44 to the nose piece 50 and providing a connector 68 for quick connection to the connector means 46 of the extender package. Sizing disc 64 connects to a movable support sleeve 70 of the stuffing horn assembly as is conventional.

Also needed is a split pressure ring 102, a split emulsion sealing ring 106, and an extender positioning means indicated at 108 for escorting extender pairs A, B, C, etc., contained within the sleeve 56, to the nose piece 50 as described hereinbelow. Other conventional components of the stuffing machine include a clipper carriage 104, clip closure means 114 and severing means 116. These are more particularly described in U.S. Pat. Nos. 4,077,090 and Re. 30,390.

FIG. 12 shows the stuffing apparatus just prior to initiating the stuffing operation. At this point the split emulsion sealing ring 106 is closed about the first extender pair A which is in an upright position on the end of a nose piece 50. The emulsion sealing ring 106 holds the unshirred portion of casing 6 in contact with the trailing extender 14 of extender pair A in order to prevent the back flow of emulsion around the outer flange 36 of the trailing extender during the stuffing operation.

Figure 13:
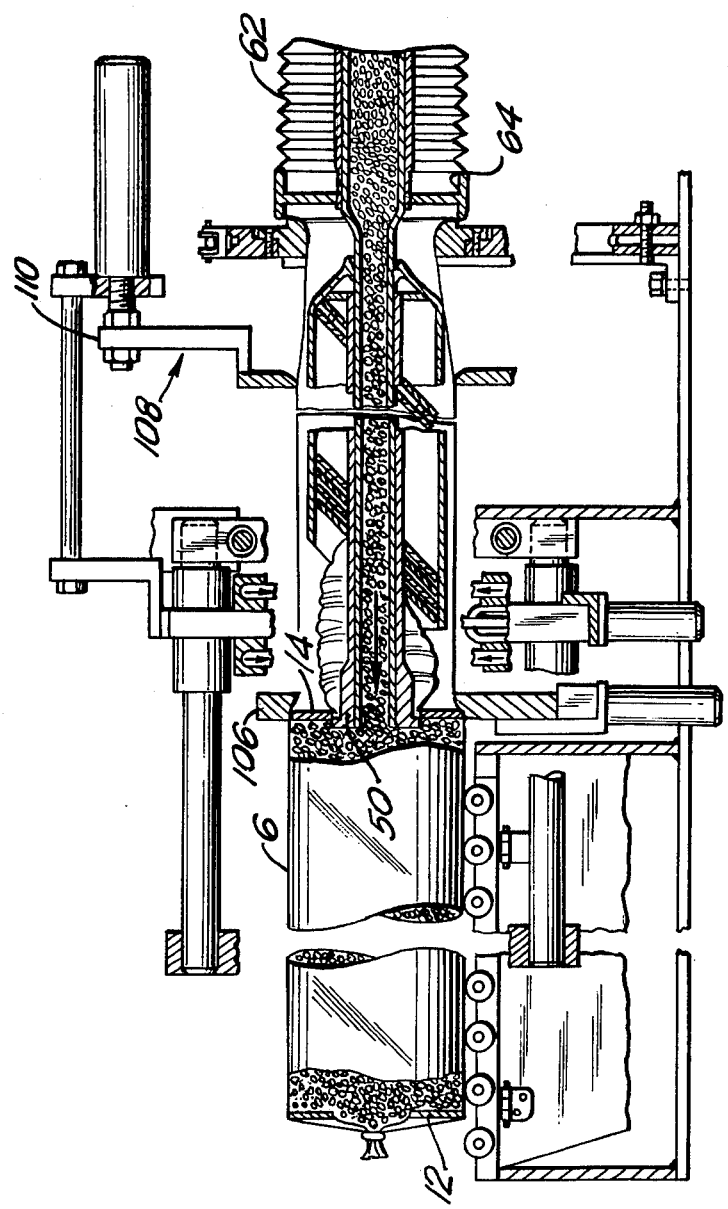

When the stuffing operation starts, the food emulsion is pumped through the stuffing horn and into the space 15 (see FIGS. 2 and 3) between the leading and trailing extenders of extender pair A with sufficient force to separate the leading extender 12 from the trailing extender 14 (FIG. 13). In this respect the snap fit engagement of shoulder 34 on the leading extender 12 under the tabs 40 of the trailing extender 14 (see FIG. 2) is not strong enough to resist the pressure of the food emulsion so the tabs and shoulder snap apart to permit separation of the leading and trailing extenders.

The holding force of the snap fit is such that if one tab gives way, the others will quickly follow. In this fashion the leading extender will break away almost simultaneously about its entire periphery so that it will remain substantially upright as stuffing commences. The force of the emulsion also acts on the trailing extender 14, but this extender is prevented from moving rearward, or to the right as viewed in FIG. 13, by the engaging action of the split emulsion sealing ring 106.

As stuffing continues, emulsion pressure causes the leading extender 12 to continue to separate and move from the trailing extender 14, pulling casing from the shirred stick 62 and over the sizing means 64 until a desired length of stuffed product is formed having a flattened leading end. When the desired length is formed, the food emulsion pump is automatically shut off.

Figure 14:
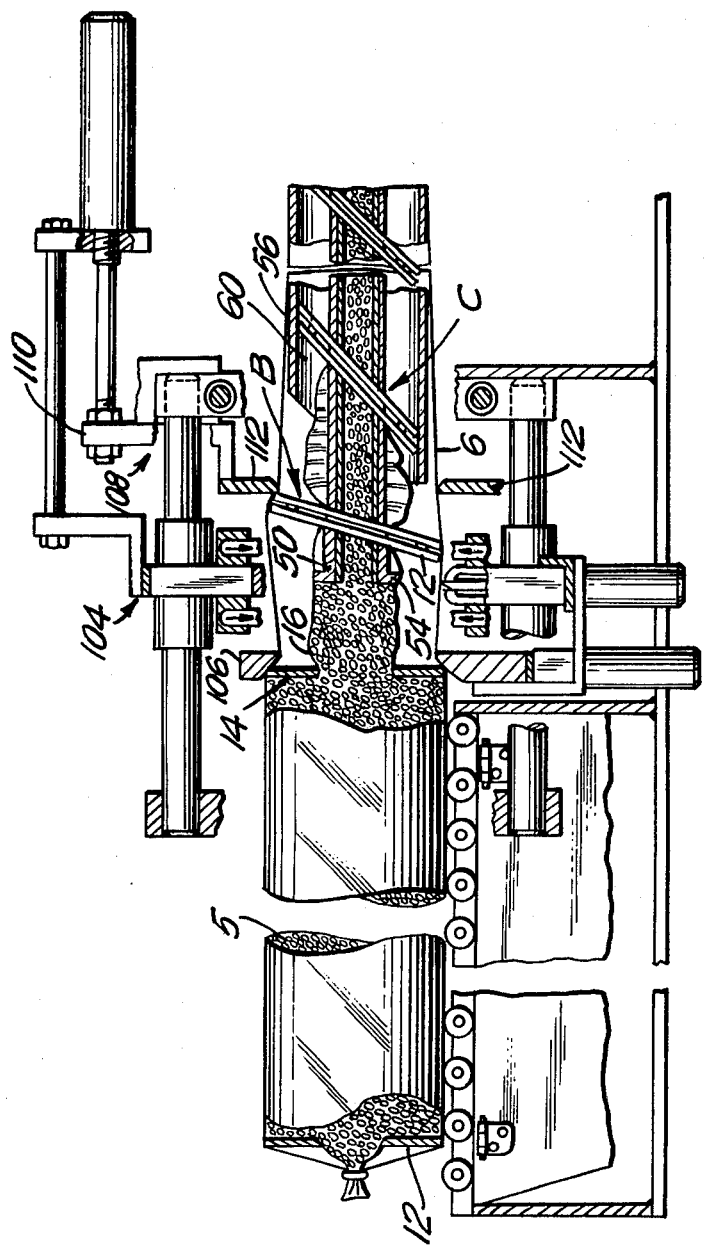

With the pump off and the desired product length having been formed, both the clipper carriage 104 and the split emulsion sealing ring 106 are advanced to the left, or forward, as viewed in FIG. 14. Movement of the sealing ring 106 causes the trailing extender 14 to move over the interrupted flange 54 so that both the trailing extender and the stuffed product 5 are moved forward.

It should be appreciated that this trailing extender 14, which now forms the flat trailing end of the stuffed product 5, is connected by a flexible tubular membrane 16 to the leading extender 12 of the next extender pair B (see FIG. 3). Consequently, as the emulsion sealing ring 106 moves the trailing extender and stuffed product forward, the next extender pair B is pulled partially free from its stored or nested position within sleeve 56 and towards the nose piece 50.

As extender pair B is pulled towards the nose piece 50, the pair begins to pivot to an upright position from its canted position within sleeve 56. Since the front end 60 of the sleeve is cut away to form the angled exit as shown, the extender pair B can begin to pivot through the sleeve opening with little resistance. This same feature is accomplished in the package article embodiment of FIG. 9 by providing slits 98 extending inward from its forward end and along the top of the wrap to a point adjacent the first extender pair B in the array. These slits 98 provide a loose flap 97 (FIG. 9a) which lifts as the extender pair begins to pivot through the forward end 96 of the flexible overwrap 90.

With the next extender pair pulled out of sleeve 56 (or out of the overwrap 90 in the case of the FIG. 9 package article), the extender positioning means 108 is in position to perform its function. FIG. 14 shows that positioning means 108 preferably includes a generally elliptical crescent shaped positioning ring 112 mounted on a movable arm 110 so that it can translate along an axis parallel to the axis of the stuffing horn. Ring 112 is disposed about the extender package and has its major and minor axes oriented with the corresponding major and minor axes of the elliptical projection formed by the canted extender pairs B, C, D, etc., as described hereinabove with respect to FIG. 5a. The major and minor axes of the elliptical crescent shaped ring 112 are slightly bigger than the corresponding axes of the elliptical projection of the extender pairs. This permits the ring to pass freely over the stored, or nested, extender pairs within sleeve 56. However, since extender pair B is partly upright, the elliptical ring 112 can engage this extender pair through the casing as the ring is moved forward or to the left as viewed in FIG. 14.

As the elliptical positioning ring 112 continues to move forward, it escorts the extender pair B to the nose piece 50 and into an upright position against the interrupted flange 54 as shown in FIG. 15. With the positioning ring 112 holding the new extender pair B tightly against the interrupted flange 54, a conventional clip and sever sequence is initiated.

In the clip and sever sequence, a pair of conventional clip closure means 114 are activated to simultaneously clip close the casing over the trailing extender 14 to capture this extender within the trailing end of the stuffed product 5 and to clip close the casing over the new extender pair B. Clipping takes place over the tubular membrane 16 which connects the trailing extender 14 to the extender pair B so that the membrane is closed together with the outer casing. A conventional severing means 116 then severs both the outer casing and tubular membrane between the clips.

After severing, the clip closing means 114 and severing means 116 are retracted. The split emulsion sealing ring 106 is opened and returned to its start position (FIG. 12) where it closes about the trailing extender 14 of the next extender pair B. The extender positioning means 108 also returns to its initial position by traveling back over the casing and sleeve 56.

The stuffing apparatus is now ready to begin its next cycle. This operation will continue to automatically produce flat ended casing stuffed products as shown in FIG. 4 until the supply of casing and extender pairs is spent. Preferably, for continuous and automatic operation, the number of extender pairs should be sufficient to provide a number of stuffed products of a desired length for any given commercial situation, taking into account the length of casing available on the shirred stick in the package article and the length of the encased stuffed product required for a particular commercial operation. The required number of extender pairs will be readily apparent to one of ordinary skill in the art. In this regard, the length of casing in the shirred stick can be varied based on a fixed number of extender pairs or the number of extender pairs can be varied based on a fixed shirred stick length. Typically, a casing having a stuffed diameter of about 4.5 inches and an unshirred casing length of 200 feet might employ 50 extender pairs.

The following example is presented to illustrate, but in no way limit, the present invention.

EXAMPLE

In order to show the improvement associated with the article of the present invention, a conventional stuffing apparatus of the type shown in Re. Pat. No. 30,390 and sold by Union Carbide Corporation as a Model 400 F SHIRMATIC Stuffing Apparatus, was modified as described above and as shown in FIG. 12. An extender package article as shown in FIG. 7 was mounted to the modified apparatus, and the modified apparatus was operated continuously and automatically to produce stuffed products having substantially flat ends. Each extender or flat disc within the extender package article was 4.56 inches in diameter.

As a control, a similar but unmodified SHIRMATIC Apparatus was operated in a conventional manner to produce stuffed products having a more conventional rounded end.

Both runs utilized a SHIRMATIC clear size 7½ to K casing. This casing has a diameter which is about 0.60 inch less than the recommended stuffing diameter of 4.62 inches. Thus, the extender diameter of 4.56 inches was greater in diameter than the unstuffed casing.

Each apparatus was adjusted to stuff the casings to the manufacturer's recommended green diameter of about 4.62 inches. Also, a similar meat bologna emulsion was utilized for each run.

Fourteen stuffed products were made using the modified apparatus and thirteen using the conventional apparatus. The maximum end-to-end variation for products stuffed with the modified apparatus was 0.02 inch compared to 0.01 inch for products stuffed with the conventional apparatus. Measurements taken about the midpoint of each product were uniform and midpoint diameters for each product averaged 4.63 inches.

After stuffing, all products underwent similar processing in a smoke chamber and were stored at 30° F. for 24 hours to produce the finished products for slicing.

Each product was sliced using a deli-type sausage slicing machine set to produce a slice 0.17 inches thick. Both the leading and trailing end of each product was sliced until the mean slice diameter approached 4.44 inches for the leading end and 4.52 inches for the trailing end.

An average of 13 slices were cut from each end of the conventional products before approaching the finished mean diameters as set out above. In comparison, only an average of 1.5 slices were taken from each end of the flat ended products which were made using the extenders and modified stuffing apparatus as described herein.

The weight of the individual slices and the combined total weight for slices from both ends of each product were recorded. This data indicated that the average amount of rework for each product having the conventional rounded ends totaled 833 grams. In contrast, the weight of the rework from the flat ended stuffed products averaged only 102 grams. Thus, the use of extenders of the present invention resulted on the average, in more than an eight-fold reduction in the amount of rework per stuffed product. The rework from the flat ended product was only 12.2% of the rework for the conventional rounded ended product.

To confirm the overall uniformity of the finished product diameter of the flat ended stuffed products, an additional six slices were taken from the end of each product. The mean diameter and weight of each of these additional slices were uniform and within acceptable limits for commercial packaging in weight-by-slice count packages.

The eight-fold decrease in rework and the slice count increase from each product as demonstrated by this test, established that extender modules of the present invention were suitable for use in the continuous and automatic production of stuffed products having flat ends.

Having described the extender module of the present invention in detail together with the manner in which the extender module can be used to produce flat ended stuffed casing products continuously and automatically, it should be appreciated that various modifications in both the structure and function of the extender module would become apparent to one skilled in the art.

For example it may not be necessary to use a mandrel 44 and sleeve 56 (FIGS. 5 and 6) or a flexible wrap 90 (FIG. 9) to maintain the integrity of the array of extender pairs in all cases. Instead, an ordered array of extender pairs A, B, C, etc., can be placed directly onto a stuffing horn. Here, the casing to be stuffed would be manually pulled or otherwise passed over the array and automatic means other than the positioning means 108 as described, or even a manual manipulation, could be employed to escort individual extender pairs A, B, C, etc. to the end of the stuffing horn.

If something less than continuous operation is desired for whatever reason, a single extender pair A, including a "tail" of flexible membrane 16 connected to both the leading and trailing extender of the pair, could be put on the end of a stuffing horn and a single, cut length of casing stuffed.

It also would be possible to facilitate use of cut lengths of casing by implanting an extender pair in each cut length of casing so as to eliminate the steps of separately putting an extender pair and cut length on to a stuffing horn. In this respect FIG. 11 shows a cut length of unshirred casing 81 having an open trailing end 83 and a leading end 85 closed by a suitable clip closure 87. One extender pair, including a leading and a trailing extender 12, 14 respectively is implanted in the cut length proximal the closed leading end, the flexible membrane "tail" 16 of leading extender 12 being clipped together with the leading end 85 of said casing length.

With this arrangement, the entire article including the cut length of casing and the extender pair can be mounted on the stuffing horn assembly in a single operation. For example, the open trailing end is simply pulled over the horn and the trailing extender 14 pushed axially to snap connect it to the end of the horn.

It also should be appreciated that the leading extender 12 of extender pair A, whether used in connection with cut lengths of casing or as the first extender pair in an ordered array could be a solid disc, that is the central opening 18 could be omitted from the leading extender of this extender pair.

While it is preferred that the extenders have as small an opening as possible, end-flattening at the leading end could be achieved by a rigid hoop-shaped leading extender having a heavier gauge membrane fixed to the hoop. Here, the rigid hoop-shape would function to square the end adjacent to the periphery of the stuffed product and would provide an anchor for tightly pulling the membrane across the hoop to flatten the end face of the stuffed product. In the absence of a rigid hoop defining the periphery of the end face, tightly pulling a membrane or casing across the end face would result in a rounded end, as is conventional.

Also, in use, one or more of the extenders or flattening disks can act as a sizing disk, performing a casing sizing function as well as a flattening function for the ends of the encased stuffed product. Generally speaking, at least some portion of the sizing function will be performed by one or more extenders of an extender module, either alone or co-acting with the optional sizing means, if used, such as sizing disc 64 of FIG. 8 or the sizing means 82, 86 of FIGS. 9 and 10.

A preferred flexible means for connecting a leading and trailing extender 12, 14 of each module 10, has been described as being a flexible tubular membrane 16. However, other flexible means could be used. For example, the extenders could be connected by one or more strings which extend between the leading and trailing extenders. Preferably, at least two strings would be used wherein the ends of the strings are attached to the extenders adjacent the openings 18, 20.

Use of the present invention for the stuffing of a chunked food product may require some modifications in the operation of the apparatus to mechanically separate, or unsnap, the detachably-connected leading and trailing extenders. In this respect, a chunked food product may not fit into space 15 between the extenders or it may lack the emulsion or liquid component to flow into space 15. Should this be the case, mechanical separation of the extenders, prior to starting the stuffing operation can be accomplished by pulling on membrane 16 after an extender pair has been positioned at the nose piece 50.

Since the trailing extender has an inside diameter smaller than the outside diameter of interrupted flange 54, the trailing extender will be held against the flange so that pulling on the leading extender can unsnap and separate the leading extender from the trailing extender. Pulling on membrane 16 can be accomplished by continuing to advance split emulsion ring 106 (FIG. 14) even after the extender pair is positioned on nose piece 50. It should be obvious that such an operation requires that the force required to separate the snap connection of the extenders be less than the force needed to force the trailing extender over the interrupted flange.

Having thus described the invention in detail, what is claimed as new is:

1. An extender module for use in producing stuffed casing products having flat ends, said module comprising:
   (a) a pair of annular discs, each with an opening therethrough, each being of a size sufficient to fit within a casing to be stuffed and each having a substantially flat surface to flatten one end of a stuffed casing product made with said casing; and
   (b) a flexible tubular membrane extending between and connecting said discs, said tubular membrane having its ends connected to each annular disc about the opening through said discs.

2. An extender module as in claim 1 wherein the opening in one of said annular discs is larger in diameter than the opening in the other of said annular discs.

3. An extender module as in claim 1 including means on at least one of said discs for detachably connecting said extender module to a disc of a second of said extender modules.

4. An extender module for use in flattening the terminal ends of a stuffed casing product comprising:
   (a) a pair of discs of a size sufficient to fit within a casing to be stuffed, each disc having a substantially flat outward facing surface and each having an inwardly facing surface, at least one of said discs having a central opening therethrough; and
   (b) flexible means extending between and connecting the inwardly facing surfaces of said discs, said discs being collapsable axially one against the other with said flexible means being folded therebetween.

5. An extender module as in claim 4 wherein each disc has a central opening therethrough.

6. An extender module as in claim 5 wherein said flexible means is a tubular membrane having its ends connected to each of said discs about said central openings.

7. An extender module as in claim 5 wherein one of said openings is larger in diameter than the other of said openings.

8. An extender module as in claim 4 wherein at least one of said discs is dished to provide a space between said discs when collapsed axially one against the other, said space being sufficient to accommodate said flexible means in its folded condition.

9. An extender module as in claim 4 including means associated with at least one of said discs for detachably connecting said module to a disc of a second of said modules.

10. An extender module as in claim 4 including a male connector on one of said discs and an associated female connector on the other whereby a plurality of said modules can be connected one to another.

11. A module as in claim 4 wherein said disc having said central opening has a portion defining the opening formed about a resilient core, said flexible means being a tubular membrane having an end captured between said formed portion and said resilient core.

12. A module as in claim 4 wherein both said discs are annular.

13. An extender module as in claim 4 wherein the size of each of said discs is such that said discs will stretch the casing into which said discs are fitted.

14. An extender module as in claim 4 wherein the size and shape of each disc is substantially equal to the cross sectional size and shape of the finished stuffed casing product to be formed utilizing said extender module.

15. An extender module for use in the making of flat ended, stuffed casing products from a continuous length of casing, said extender module comprising:
   (a) a trailing member having a substantially flat outwardly facing surface to flatten the closed trailing end of a first stuffed casing product, an inwardly facing surface and a central opening through said member;
   (b) a leading member having a substantially flat outwardly facing surface to flatten the closed leading end of a second stuffed casing product next formed after the first casing product from the continuous length of casing, an inwardly facing surface and a central opening extending through said leading member; and
   (c) a flexible tubular membrane extending between and connecting the inwardly facing surfaces of said trailing and leading members, the ends of said flexible tubular membrane being connected about the openings in said members and said membrane being foldable to permit collapse of said members axially one against the other.

16. An extender module as in claim 15 wherein the opening in said trailing member is smaller in diameter than the opening in said leading member.

17. An extender module as in claim 15 including a resilient core member in said trailing and leading members about the openings therein, said leading and trailing members each having a portion defining said openings formed over said core member, and said tubular membrane having its ends captured between said resilient cores and said portions.

18. An extender module as in claim 15 including means for detachably connecting said trailing member with a leading member of a second extender module whereby at least two of said extender modules can be detachably connected one to another.

19. An extender module as in claim 18 wherein said means includes cooperating connector members associated with the outwardly facing surfaces of said leading and trailing members for detachably connecting, in face-to-face relationship, the trailing member of one extender module to the leading member of a second extender module.

20. An extender module as in claim 19 wherein said means includes engaging tab and shoulder portions on the outwardly facing surfaces of said trailing and leading member for detachably connecting a trailing member of one extender module to a leading member of a second extender module.

21. An article for use in the manufacture of stuffed casing products having substantially flat leading and trailing ends, said article comprising:
   (a) at least two extender modules one of said modules including a pair of annular discs each with an opening therethrough and the other of said modules including a pair of discs at least one of which is annular and has an opening therethrough, each of said discs being of a size capable of fitting within a casing to be stuffed, and each disc having at least one substantially flat surface for flattening an end of a stuffed casing product, and a flexible means extending between and connecting the discs of each of said pairs; and
   (b) means on at least one disc of each module for detachably connecting a disc of one of said extender modules in face-to-face relationship with a disc of another of said extender modules.

22. An article as in claim 21 wherein said flexible means is a tubular membrane, an end of said tubular membrane being connected about the opening in each annular disc.

23. An article for use in the manufacture of stuffed casing products having substantially flat leading and trailing ends, said article comprising:
   (a) a first extender module including
      (i) a first pair of substantially flat annular discs each having an opening therethrough, and each disc adapted to flatten an end of an encased stuffed product, and
      (ii) a flexible tubular membrane having its ends extending between and connected to said annular discs about the openings therethrough;
   (b) a second extender module including
      (i) a second pair of said substantially flat annular discs, and
      (ii) a flexible tubular membrane having its ends extending between and connected to said second pair of annular discs about the opening therethrough;
   (c) means associated with a leading annular disc of one of said extender modules and a trailing annular disc of another of said extender modules for detachably connecting the same together in a face-to-face relationship to form an ordered array of detachably connected extender modules.

24. An article as in claim 23 wherein said means comprises:
   (a) a shoulder formed in one of said detachably connected annular discs adjacent the outer periphery thereof; and
   (b) a tab on the other of said detachably connected annular discs adapted to enter a detachable snap fit engagement with said shoulder.

25. An article suitable for introduction into a casing to be stuffed to flatten the ends of a resulting, stuffed casing product, said article comprising:
   (a) a first pair of members, including a leading member having a face adapted to flatten the leading end of a stuffed casing product to be formed from said casing, and a trailing member having a face adapted to flatten the trailing end of said stuffed casing product;
   (b) seperable breakaway means connecting said members in a face-to-face relationship wherein said face-to-face connected leading and trailing members define a space therebetween;
   (c) said trailing member having an opening therein;
   (d) said seperable breakaway means being adapted to separate to permit the introduction of the product to be stuffed through said opening and into the space between said members.

26. An article as in claim 25 wherein said means is adapted to separate responsive to the pressure of the product being introduced into said space to permit the detachment of one of said members from the other.

27. An article as in claim 25 including a flexible tubular membrane having one end attached to said trailing member about the opening therein and its second end extending away from said space.

28. An article as in claim 27 including:
(a) a second pair of detachably connected members axially aligned with said first pair and including a leading and a trailing member both of which have an opening therethrough; and
(b) said flexible tubular membrane having its second end connected to the leading member of said second pair about the opening therein, said flexible tubular membrane being foldable to allow collapse of one of said pairs of detachably connected members axially against the other.

29. An encased food product, having closed leading and trailing ends including a substantially flat disc implanted in each of said ends, a closure means for closing each end of the casing of said product over each of said discs, the disc at said trailing end having an opening therethrough, and a flexible tubular membrane having one end connected to said disc at said trailing end about said opening, the other end of said flexible tubular membrane being closed together with the casing by said closure means at the trailing end, and the outer periphery of both discs being in contact with the inner periphery of the casing whereby said encased food product has generally the shape of a right circular cylinder, said discs being components of a disc pair inserted into the casing prior to the stuffing thereof, wherein said disc pair is separated responsive to a food product being introduced through said opening and between said discs to stuff the casing.

30. A stuffed casing product as in claim 29 wherein both of said discs have a central opening therethrough and both have a flexible tubular membrane with one end fixed to its associated disc about said opening and a second end closed together with said casing.

31. A stuffed casing product as in claim 29 wherein the outer periphery of both discs is in stetch contact with the inner periphery of said casing.

32. An article for the production of a casing stuffed product having flat ends, said article consisting essentially of:
(a) a length of casing to be stuffed, said casing length having a closed end and an open end;
(b) a pair of substantially flat members one of which is a leading member and the other of which is a trailing member arranged in a face-to-face relationship and disposed in said casing proximal to the closed end thereof with said leading member towards said closed end, the outer perimeter of said members being approximately the same length as the inner perimeter of said casing when stuffed, at least said trailing member having an opening therein to permit the introduction of a product to be stuffed between said face-to-face members.

33. An article as in claim 32 wherein said members are detachably connected together and said members are adapted to separate one from the other responsive to the pressure of the introduction of the product to be stuffed through said opening and between said members.

34. An article as in claim 32 wherein said members are arranged with the outer periphery thereof in stretch contact with the inner periphery of said casing to be stuffed.

35. An article as in claim 32 including a flexible tubular membrane having one end attached about the opening in said trailing member, the second end of said membrane being open.

36. An article as in claim 32 wherin both said members are annular having central openings therethrough.

37. An article as in claim 36 including two flexible tubular membranes each having one end connected to an annular member about the opening therein, the second end of one of said tubular membranes being closed together with said casing closed end.

* * * * *

UNITED STATES PATENT AND TRADEMARK OFFICE
CERTIFICATE OF CORRECTION

PATENT NO. : 4,466,984
DATED : August 21, 1984
INVENTOR(S) : Vytautas Kupcikevicius It is certified that error appears in the above-identified patent and that said Letters Patent is hereby corrected as shown below:

In the abstract, line 9, change "discs" to --disc--.

Col. 9, line 19, change "Tne" to --The--.

Col. 13, line 52, delete "to".

Signed and Sealed this

Nineteenth Day of March 1985

[SEAL]

Attest:

DONALD J. QUIGG

Attesting Officer

Acting Commissioner of Patents and Trademarks